(12) United States Patent
Fraidlin et al.

(10) Patent No.: US 6,272,027 B1
(45) Date of Patent: Aug. 7, 2001

(54) AC ACTIVE CLAMP FOR ISOLATED POWER FACTOR CORRECTOR AND METHOD OF OPERATING THE SAME

(76) Inventors: Simon Fraidlin, 4512 Chesterwood Dr., Plano, TX (US) 75093; Anatoliy Polikarpov, 2530 E. Meadows, Apt. M, Mesquite, TX (US) 75150

( * ) Notice: Subject to any disclaimer, the term of this patent is extended or adjusted under 35 U.S.C. 154(b) by 0 days.

(21) Appl. No.: 09/627,677

(22) Filed: Jul. 28, 2000

(51) Int. Cl.[7] ............................. H02M 3/335; G05F 1/10
(52) U.S. Cl. ............................. 363/26; 363/25; 323/222
(58) Field of Search .............................. 363/26, 25, 82, 363/90, 56, 55, 50; 323/282, 283, 284, 285, 222

(56) References Cited

U.S. PATENT DOCUMENTS

| | | | |
|---|---|---|---|
| 5,471,376 | * 11/1995 | Tsai et al. | 363/20 |
| 5,489,837 | * 2/1996 | Arakawa | 323/207 |
| 5,510,974 | * 4/1996 | Gu et al. | 363/134 |
| 5,598,326 | * 1/1997 | Liu et al. | 363/34 |
| 5,736,842 | * 4/1998 | Jovanovic | 323/222 |
| 5,815,386 | * 9/1998 | Gordon | 363/50 |
| 5,923,153 | * 7/1999 | Liu | 323/222 |
| 5,978,238 | * 11/1999 | Liu | 363/56 |
| 6,191,960 | * 2/2001 | Fraidlin et al. | 363/25 |

OTHER PUBLICATIONS

"A High–Performance Single–Phase Rectifier with Input Power Factor Correction" by Roberto Martinez and Prasad N. Enjeti; 1996 IEEE; pp. 311–317, 3/96.

* cited by examiner

Primary Examiner—Rajnikant B. Patel

(57) ABSTRACT

An AC active clamp, a method of operating the same and a power factor corrector employing the AC active clamp or the method. The power factor corrector has a primary switching circuit coupled to a primary winding of an isolation transformer and a rectifier coupled to a secondary winding of the isolation transformer. The primary switching circuit has first and second power switches configured to receive unrectified AC power. In one embodiment, the AC active clamp includes a switching circuit having first and second clamping switches series coupled in opposition and a capacitor coupled to the switching circuit. The switching circuit and the capacitor are coupled across at least a portion of the primary winding and are configured to mitigate adverse effects of a reverse recovery phenomenon associated with the rectifier and to effect substantially zero voltage switching of the first and second power switches of the primary switching circuit.

21 Claims, 5 Drawing Sheets

AC ACTIVE CLAMP FOR ISOLATED POWER FACTOR CORRECTOR AND METHOD OF OPERATING THE SAME

TECHNICAL FIELD OF THE INVENTION

The present invention is directed, in general, to power conversion and, more specifically, to an AC active clamp for an isolated power factor corrector, a method of operating the AC active clamp and an isolated power factor corrector employing the AC active clamp.

BACKGROUND OF THE INVENTION

A power supply is a power processing circuit that converts an input voltage or current source waveform into a specified output voltage or current waveform. A switched-mode power supply is a frequently employed power supply that converts an input voltage waveform into a specified output voltage or current waveform. There are several families of switched-mode power supplies employing a variety of topologies such as a boost topology.

In off-line power supply applications, a high power factor is frequently required. The power factor is defined as a ratio of the actual power delivered to the load to a product of the voltage and current at the input of the power supply. While a power factor of unity is the ultimate goal, a lesser power factor may, in some cases, be considered acceptable. Therefore, in many off-line applications, a power factor corrector (PFC) may be necessary to provide an acceptable power factor.

A power factor corrector employing a boost topology generally includes a boost inductor and a power switch coupled to the boost inductor. The power factor corrector further includes a rectifier (a rectifying diode) coupled to a node between the boost inductor and the power switch. The power factor corrector still further includes an output capacitor coupled across an output thereof. The output capacitor is usually large to ensure a constant output voltage. A load is then connected in parallel across the output capacitor.

The power factor corrector generally operates as follows. The power switch is closed (conducting) for a first interval D (D interval). The rectifying diode is reverse-biased, isolating the output capacitor and, therefore, the load from the input of the power factor corrector. During this interval, the input voltage supplies energy to charge the boost inductor and the inductor current increases. Since the load is isolated from the input voltage, a stored charge in the output capacitor powers the load. Then, for a second interval 1-D (1-D interval), the power switch is opened (non-conducting). The inductor current decreases as energy from both the boost inductor and the input flows forward through the rectifying diode to charge the output capacitor and power the load. By varying a duty cycle of the power switch, the output voltage may be controlled.

Conventional power factor correctors employing the boost converter topology, however, cannot directly process the AC power available from the AC line. An input full wave rectifier bridge is required at the input to rectify the AC voltage from the AC line. The rectified AC voltage may then be processed by the power factor corrector. The rectifier bridge is subject to dissipative losses, however, particularly at low AC line voltages (e.g., 85 to 100 VAC). Power dissipation in the bridge diodes of the rectifier bridge may be as high as 2 to 3% of the total power processed by the power supply. Further, the rectifier bridge may contribute to electromagnetic interference noise generated by the power supply.

Analogous to other types of power supplies, the power factor corrector is subject to inefficiencies that impair its overall performance. More specifically, the power switch and rectifying diode may be subject to conduction losses that reduce the efficiency of the power factor corrector. Additionally, the power switch [e.g., a metal-oxide semiconductor field-effect transistor (MOSFET)] is subject to switching losses that occur, in part, when a charge built up in a parasitic capacitance of the power switch is dissipated when the power switch is closed (turned ON). Furthermore, the rectifying diode may also be subject to a reverse recovery phenomenon, when the power switch is closed (turned ON), that induces a substantial current spike through both the power switch and the rectifying diode. The losses associated with the power switch and the rectifying diode increase linearly as the switching frequency of the power supply is increased. Therefore, the reverse recovery and switching losses associated with the rectifying diode and power switch will impair the overall efficiency of the power supply.

Accordingly, what is needed in the art is an active clamp, employable with the power factor corrector, that reduces the losses associated with the rectifier bridge and the reverse recovery phenomenon and further reduces the switching losses associated with the power switch(es) of the power factor corrector.

SUMMARY OF THE INVENTION

To address the above-discussed deficiencies of the prior art, the present invention provides an AC active clamp, a method of operating the same and a power factor corrector employing the AC active clamp or the method. The power factor corrector has a primary switching circuit coupled to a primary winding of an isolation transformer and a rectifier coupled to a secondary winding of the isolation transformer. The primary switching circuit has first and second power switches configured to receive unrectified AC power. In one embodiment, the AC active clamp includes a switching circuit having first and second clamping switches series coupled in opposition and a capacitor coupled to the switching circuit. The switching circuit and the capacitor are coupled across at least a portion of the primary winding and are configured to mitigate adverse effects of a reverse recovery phenomenon associated with the rectifier and to effect substantially zero voltage switching of the first and second power switches of the primary switching circuit.

The present invention introduces, in one aspect, an AC active clamp employable with various isolated power factor corrector topologies. The power factor corrector is advantageously configured to receive unrectified AC power and may thus avoid, for instance, the use of an input full wave rectifier bridge (or other input rectifier topologies) for AC line rectification and the inefficiencies associated therewith.

In one embodiment of the present invention, the capacitor is coupled between the switching circuit and a first end tap of the primary winding. The AC active clamp further includes a second capacitor coupled between the switching circuit and a second end tap of the primary winding. The capacitor and the second capacitor may thus cooperate to effect zero voltage switching of the first and second power switches of the primary switching circuit. Of course, the capacitor and the second capacitor need not be connected to the first and second end taps of the primary winding, respectively, but may, alternatively, be connected to respective first and second intermediate taps of the primary winding.

In one embodiment of the present invention, the AC active clamp further includes an auxiliary diode coupled across the capacitor. The auxiliary diode is configured to reduce an output ripple current of the power factor corrector.

In another embodiment of the present invention, the capacitor is coupled between the switching circuit and a first end tap of the primary winding. The AC active clamp includes a second capacitor coupled between the switching circuit and a second end tap of the primary winding. The AC active clamp further includes a first auxiliary diode coupled across the capacitor and a second auxiliary diode coupled across the second capacitor. The first and second auxiliary diodes may thus cooperate to reduce an output ripple current of the power factor corrector.

In another embodiment of the present invention, the switching circuit further includes third and fourth clamping switches series coupled in opposition. The AC active clamp further includes a second capacitor coupled to the series-coupled third and fourth clamping switches. The capacitor and the second capacitor may thus operate independently from each other.

In one embodiment of the present invention, the power factor corrector employs a magnetically coupled filter to reduce electromagnetic interference. The magnetically coupled filter is advantageously capable of performing the functions of filtering and energy storage and transfer.

In one embodiment, the power factor corrector employs topologies selected from the group consisting of (1) boost topologies, (2) topologies having capacitive coupling between an input and an output of the power factor corrector (so called "Cuk"), (3) SEPIC topologies, (4) flyback topologies and (5) Zeta topologies. Of course, non-isolated power factor corrector topologies other than those listed above are also well within the broad scope of the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
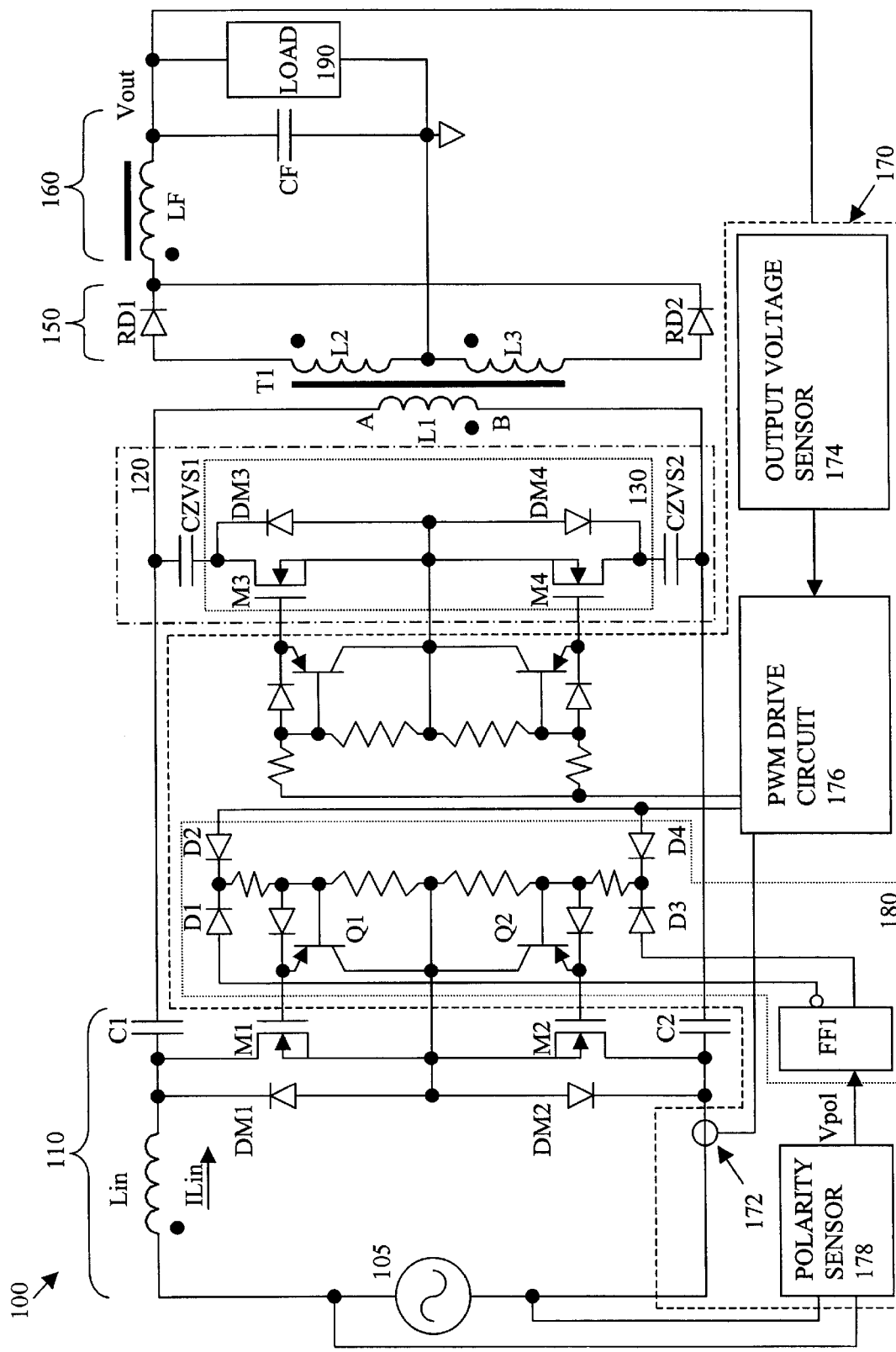
FIG. 1 illustrates a schematic diagram of an embodiment of an isolated power factor corrector constructed in accordance with the principles of the present invention.

Referring initially to FIG. 1, illustrated is a schematic diagram of an embodiment of an isolated power factor corrector 100 constructed in accordance with the principles of the present invention. The power factor corrector 100 has an input couplable to a source of AC power 105 and an output couplable to a load 190. The power factor corrector 100 is employable in off-line applications and is advantageously designed to receive unrectified AC power directly from the source of AC power 105. The power factor corrector 100 thus does not require an input full wave rectifier bridge to rectify the AC power and thereby advantageously avoids dissipative losses that would be incurred, for instance, with respect to the bridge diodes of the input full wave rectifier bridge.

The power factor corrector 100 includes a primary switching circuit 110 coupled to a primary winding L1 of an isolation transformer T1. The power factor corrector 100 further includes a rectifier 150 (having first and second rectifying diodes RD1, RD2) coupled to a secondary winding (illustrated as first and second secondary winding portions L2, L3) of the isolation transformer T1. The power factor corrector 100 further includes an output filter 160 (having a filter inductor LF and a filter capacitor CF) coupled to the output of the power factor corrector 100.

The primary switching circuit 110 includes an input inductor Lin coupled to the input. The primary switching circuit 110 further includes first and second power switches M1, M2 coupled to the input inductor Lin. In the illustrated embodiment, the first and second power switches M1, M2 are metal oxide semiconductor field effect transistors (MOSFETs) each having an intrinsic body diode (explicitly illustrated and designated as DM1, DM2, respectively). Of course, other controllable switches, such as bipolar junction transistors (BJTs) and gallium arsenide field-effect transistors (GaAsFETs), are well within the broad scope of the present invention.

The primary switching circuit 110 further includes a first energy storage capacitor C1 coupled between the first power switch M1 and a first end tap A of the primary winding L1. The primary switching circuit 110 further includes a second energy storage capacitor C2 coupled between the second power switch M2 and a second end tap B of the primary winding L1. The first and second energy storage capacitors C1, C2 store energy and provide the energy for transfer to the output when the first and second power switches M1, M2 are closed (ON). While the illustrated embodiment employs both the first and second energy storage capacitors C1, C2, the second energy storage capacitor C2 is not required to practice the present invention.

The power factor corrector 100 further includes an AC active clamp 120 coupled across the primary winding L1. The AC active clamp 120 is advantageously employable to process AC power. The AC active clamp 120 includes a switching circuit 130 having first and second clamping switches M3, M4 series coupled in opposition. In the illustrated embodiment, the first and second clamping switches M3, M4 are MOSFETs each having an intrinsic body diode (explicitly illustrated and designated as DM3, DM4, respectively). Of course, other controllable switches are well within the broad scope of the present invention.

The AC active clamp 120 further includes a first clamping and energy storage capacitor CZVS1 coupled to the switching circuit 130. In the illustrated embodiment, the first clamping and energy storage capacitor CZVS1 is coupled between the switching circuit 130 and the first end tap A of the primary winding L1. The AC active clamp 120 further includes a second clamping and energy storage capacitor CZVS2 coupled to the switching circuit 130. In the illustrated embodiment, the second clamping and energy storage capacitor CZVS2 is coupled between the switching circuit 130 and the second end tap B of the primary winding L1. The switching circuit 130 and the first and second clamping and energy storage capacitors CZVS1, CZVS2 are configured to mitigate adverse effects of a reverse recovery phenomenon associated with the rectifier 150 and to effect substantially zero voltage switching of the first and second power switches M1, M2 of the primary switching circuit 110.

The power factor corrector 100 still further includes a controller 170 coupled to the first and second power switches M1, M2 of the primary switching circuit 110 and the first and second clamping switches M3, M4 of the AC active clamp 120. In the illustrated embodiment, the controller 170 includes a current sensor 172 coupled to the input of the power factor corrector 100. The controller 170 further includes an output voltage sensor 174 coupled to the output of the power factor corrector 100.

The controller 170 further includes a drive circuit 176 that receives a signal representing the input current and a signal representing an output voltage Vout and develops therefrom drive signals for the first and second power switches M1, M2 and the first and second clamping switches M3, M4. In the illustrated embodiment, the drive circuit 176 is a pulse-width modulation (PWM) drive circuit configured to provide pulse-width modulated drive signals to the first and second power switches M1, M2 and the first and second clamping switches M3, M4 of the AC active clamp 120. By monitoring both the input current and the output voltage Vout, the power factor corrector 100 may correct the power factor (i.e., the shape of the input current) while maintaining the output voltage Vout at a substantially constant level despite fluctuations in either the input AC power or the load 190. While the illustrated drive circuit 176 employs a pulse-width modulated drive circuit 176, other drive circuits not employing pulse-width modulation are well within the broad scope of the present invention.

Portions of the drive circuit 176 may be embodied in an integrated circuit, such as the UC3854 manufactured by Unitrode Corporation of Merrimack, N.H. The UC3854 is an example of an integrated circuit that may be employed to advantage in some embodiments of the present invention. Of course, other controllers may be employed and still be well within the broad scope of the present invention.

In the illustrated embodiment, the controller 170 further includes a polarity sensor 178, coupled across the input of the power factor corrector 100, that senses a polarity of the input AC power. The polarity sensor 178 develops a polarity signal Vpol indicative of the polarity of the input AC power. The controller 170 further includes a steering circuit 180 coupled to the polarity sensor 178. The steering circuit 180 receives the polarity signal Vpol and accordingly steers the drive signal from the drive circuit 176 to the appropriate one(s) of the first and second power switches M1, M2 depending on the polarity signal Vpol.

In the illustrated embodiment, the steering circuit 180 includes a bistable circuit (flip-flop FF1) coupled to the polarity sensor 178. The flip-flop FF1 receives the polarity signal Vpol and accordingly provides inverted and non-inverted outputs based thereon. The steering circuit 180 further includes a first OR-ing circuit (first and second diodes D1, D2) coupled between the inverted output of the flip-flop FF1 and a drive signal output of the drive circuit 176. The steering circuit 180 further includes a second OR-ing circuit (third and fourth diodes D3, D4) coupled between the non-inverted output of the flip-flop FF1 and the drive signal output of the drive circuit 176. The steering circuit 180 further includes a first drive switch Q1 (and its associated components) coupled between the first OR-ing circuit and the first power switch M1. The steering circuit 180 still further includes a second drive switch Q2 (and its associated components) coupled between the second OR-ing circuit and the second power switch M2. While the illustrated embodiment of the steering circuit 180 employs the first and second OR-ing circuits and the first and second drive switches Q1, Q2, other circuits capable of steering the drive signal to the appropriate power switches (such as the first and second power switches M1, M2) are well within the broad scope of the present invention.

The power factor corrector 100 operates as follows. During a first half-cycle, wherein the polarity of the AC power is positive, the polarity signal Vpol is high (i.e., logic 1). The inverted output of the flip-flop FF1 is low (i.e., logic 0), while the non-inverted output is high. At the first OR-ing circuit (i.e., first and second diodes D1, D2), the low logic signal from the inverted output of the flip-flop FF1 is OR-ed with the drive signal from the drive circuit 176. The drive signal from the drive circuit 176 may thus pass through the first OR-ing circuit to drive the first power switch M1. At the second OR-ing circuit (i.e., third and fourth diodes D3, D4), the high logic signal from the non-inverted output of the flip-flop FF1 effectively overrides the drive signal from the drive circuit 176, resulting in a high logic signal to both the second drive switch Q2 and the second power switch M2. The second power switch M2 is thus closed (ON) during the first half-cycle.

Within the first half-cycle, the drive signal is high for a DT interval (of a duty cycle) of the drive signal. The first power switch M1 is closed (ON), and the second power switch M2 is closed (ON), to place the input inductor Lin across the source of AC power 105. An input inductor current ILin ramps up, storing energy in the input inductor Lin. During the DT interval, the first and second energy storage capacitors C1, C2 are coupled across the primary winding L1. Energy from the first and second energy storage capacitors C1, C2 is transferred across the isolation transformer T1 to the rectifier 150. The first rectifying diode RD1 of the rectifier 150 is conducting (ON) to transfer the energy through the filter inductor LF to the filter capacitor CF and the load 190.

Then, for a (1-D)T interval (of the duty cycle associated with the first half-cycle), the drive signal from the drive circuit 176 is low. The first drive switch Q1 closes, causing the first power switch M1 to open (turn OFF). The first clamping switch M3 is closed (turned ON) substantially simultaneously with the opening (turning OFF) of the first power switch M1. The first clamping switch M3 may be closed (turned ON) with substantially zero voltage thereacross to reduce switching loss.

With the first power switch M1 open (OFF), the input inductor Lin now discharges its stored energy through the first and second energy storage capacitors C1, C2, the primary winding L1, the second portion of the secondary winding L3, the second rectifying diode RD2 and the filter inductor LF to the filter capacitor CF and the load 190. As energy is transferred to the load 190, the magnetic components (the input inductor Lin, the primary winding L1 and the filter inductor LF) are in series.

A difference current, arising from differences in currents through the magnetic components, may be compensated for by the switching circuit 130 and the first and second clamping and energy storage capacitors CZVS1, CZVS2. When the difference current is positive, the difference current flows through the first clamping and energy storage capacitor CZVS1, the first clamping switch M3 (which is closed (ON) during the (1-D)T interval), the body diode DM4 of the second clamping switch M4, and the second clamping and energy storage capacitor CZVS2. In this case, the second clamping switch M4 can be closed (ON) or open (OFF). Once current is flowing through the body diode DM4 of the second clamping switch M4, the second clamping switch M4 can be closed (turned ON) with substantially zero volts thereacross. As the difference current flows to the output of the power factor corrector 100, the difference current will decrease to zero, then become negative.

When the difference current is negative, the difference current flows through the second clamping and energy storage capacitor CZVS2, the second clamping switch M4, which is now closed (ON), the body diode DM3 of the first clamping switch M3, and the first clamping and energy storage capacitor CZVS1. In this case, the first clamping switch M3 can be closed (ON) or open (OFF). Once current is flowing through the body diode DM3 of the first clamping switch M3, the first clamping switch M3 can be closed (turned ON) with substantially zero volts thereacross.

The first and second clamping and energy storage capacitors CZVS1, CZVS2 may store a portion of the energy resulting from the difference current when the input voltage is sufficiently high. Then, when the input voltage is low (or substantially close to zero), the first and second clamping and energy storage capacitors CZVS1, CZVS2 may be discharged. The energy stored in the first and second clamping and energy storage capacitors CZVS1, CZVS2 may be employed to provide power to the output of the power factor corrector 100.

To start the next DT interval, the first power switch M1 should be closed (turned ON). To close (turn ON) the first power switch M1 with substantially zero voltage switching, however, the second clamping switch M4 should be opened (turned OFF). In an advantageous embodiment, therefore, the second clamping switch M4 is opened (turned OFF) a short time prior to the start of the next DT interval. Then, after a small delay, the first power switch M1 may be closed (turned ON) with substantially zero volts thereacross to start the next DT interval.

Then, during a second half-cycle, wherein the polarity of the AC power is negative, the drive circuit 170 closes (turns ON) the first power switch M1 and modulates the second power switch M2 to regulate the output voltage Vout.

For a DT interval (of a duty cycle associated with the second half-cycle), the second power switch M2 is closed (ON), and the first power switch M1 is closed (ON), to place the input inductor Lin across the source of AC power 105. As before, the input inductor current ILin ramps up, storing energy in the input inductor Lin. The direction of the input inductor current ILin during the second half-cycle, however, may be opposite to the direction of the input inductor current ILin during the first half-cycle discussed above.

During the DT interval, the first and second energy storage capacitors C1, C2 are coupled across the primary winding L1. Energy from the first and second energy storage capacitors C1, C2 is transferred across the isolation transformer T1 to the rectifier 150. Due to the polarity of the input AC power, the second is rectifying diode RD2 of the rectifier 150 is ON (during the second half-cycle) to transfer the energy through the filter inductor LF to the filter capacitor CF and the load 190.

Then, during a (1-D)T interval (of the duty cycle associated with the second half-cycle), the second power switch M2 is open (OFF). The second clamping switch M4 is closed (turned ON) substantially simultaneously with the opening (turning OFF) of the second power switch M2. The second clamping switch M4 may be closed (turned ON) with substantially zero voltage thereacross to reduce switching loss.

With the second power switch M2 open (OFF), the input inductor Lin now discharges its stored energy through the first and second energy storage capacitors C1, C2, the primary winding L1, the first portion of the secondary winding L2, the first rectifying diode RD1 and the filter inductor LF to the filter capacitor CF and the load 190. As energy is transferred to the load 190, the magnetic components (input inductor Lin, primary winding L1 and filter inductor LF) are in series.

A difference current, arising from differences in currents through the magnetic components may be compensated for (during the second half-cycle) by the first and second clamping and energy storage capacitors CZVS1, CZVS2. The first and second clamping and energy storage capacitors CZVS1, CZVS2 may be charged by current flowing through the second clamping and energy storage capacitor CZVS2, the second clamping switch M4 (which is closed (ON) during the (1-D)T interval), the body diode DM3 of the first clamping switch M3, and the first clamping and energy storage capacitor CZVS1. In this case, the first clamping switch M3 can be closed (ON) or open (OFF). Once current is flowing through the body diode DM3 of the first clamping switch M3, the first clamping switch M3 can be closed (turned ON) with substantially zero volts thereacross. As the difference current flows to the output of the power factor corrector 100, the difference current will decrease to zero, then become negative.

When the difference current is negative, the difference current flows through the first clamping and energy storage capacitor CZVS1, the first clamping switch M3, which is now closed (ON), the body diode DM4 of the second clamping switch M4, and the second clamping and energy storage capacitor CZVS2. In this case, the second clamping switch M4 can be closed (ON) or open (OFF). Once current is flowing through the body diode DM4 of the second clamping switch M4, the second clamping switch M4 can be closed (turned ON) with substantially zero volts thereacross.

The first and second clamping and energy storage capacitors CZVS1, CZVS2 may store a portion of the energy resulting from the difference current when the input voltage is sufficiently high. Then, when the input voltage is low (or substantially close to zero), the first and second clamping and energy storage capacitors CZVS1, CZVS2 may be discharged. The energy stored in the first and second clamping and energy storage capacitors CZVS1, CZVS2 may be employed to provide power to the output of the power factor corrector 100. While the illustrated embodiment employs both the first and second clamping and energy storage capacitors CZVS1, CZVS2, only one of the first and second clamping and energy storage capacitors CZVS1, CZVS2 is required to practice the present invention.

To start the next DT interval, the second power switch M2 should be closed (turned ON). To close (turn ON) the second power switch M2 with substantially zero voltage switching, however, the first clamping switch M3 should be opened (turned OFF). In an advantageous embodiment, therefore, the first clamping switch M3 is opened (turned OFF) a short time prior to the start of the next DT interval. Then, after a small delay, the second power switch M2 may be closed (turned ON) with substantially zero volts thereacross to start the next DT interval.

The drive patterns of the first and second power switches M1, M2 are thus alternated every half-cycle. By closing one of the first or second power switches M1, M2 for substantially all of the duration of each half-cycle, the topology of the power factor corrector 100 may be advantageously reduced to that approximating a conventional boost converter, with the appropriate components available to process either the positive or negative polarity AC power. The power factor corrector 100 may thus be employed in off-line applications without the use of an input full wave rectifier bridge, which was generally required by power factor correctors of the prior art.

While the power factor corrector 100 is advantageously capable of providing power factor correction without the need for the input full wave rectifier bridge, the alternating waveform from the source 105 in conjunction with the small value of the first and second clamping and energy storage capacitors CZVS1, CZVS2 may result in some output current ripple. The power factor corrector 100 may, therefore, be employable with loads such as DC motors that are not particularly sensitive to the output current ripple.

Figure 2:
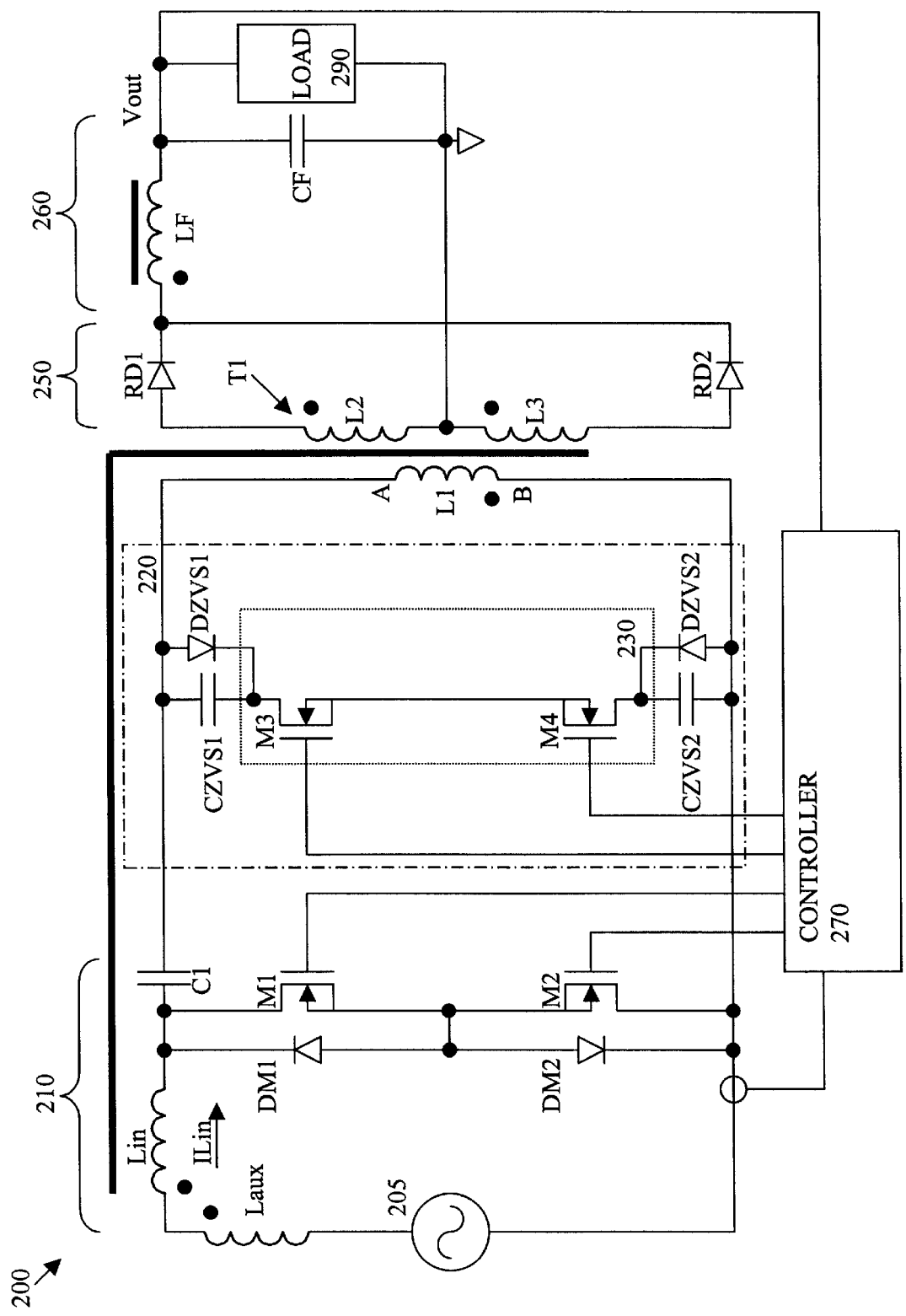
FIG. 2 illustrates a schematic diagram of another embodiment of an isolated power factor corrector constructed in accordance with the principles of the present invention.

Turning now to FIG. 2, illustrated is a schematic diagram of another embodiment of an isolated power factor corrector 200 constructed in accordance with the principles of the present invention. The power factor corrector 200 has an input couplable to a source of AC power 205 and an output couplable to a load 290. The power factor corrector 200 includes a primary switching circuit 210 coupled to a primary winding L1 of an isolation transformer T1. The power factor corrector 200 further includes a rectifier 250 (having first and second rectifying diodes RD1, RD2) coupled to a secondary winding (illustrated as first and second secondary winding portions L2, L3) of the isolation transformer T1. The power factor corrector 200 further includes an output filter 260 (having a filter inductor LF and a filter capacitor CF) coupled to the output of the power factor corrector 200. In the illustrated embodiment, the filter inductor LF is a magnetically coupled inductance embodied in an integrated package with the isolation transformer T1.

The primary switching circuit 210 includes an input inductor Lin coupled to the input. In the illustrated embodiment, the input inductor Lin is a magnetically coupled inductance embodied in an integrated package with the isolation transformer T1. An auxiliary inductor Laux may be a leakage inductance of the input inductor Lin or may be an additional inductance employed to supplement the input inductor Lin. The use of the magnetically coupled inductances advantageously reduces the size and component count of the power factor corrector 200.

The primary switching circuit 210 further includes first and second power switches M1, M2 (each having an intrinsic body diode DM1, DM2, respectively) coupled to the input inductor Lin. The primary switching circuit 210 further includes an energy storage capacitor C1 coupled between the first power switch M1 and a first end tap A of the primary winding L1.

The power factor corrector 200 further includes an AC active clamp 220 coupled across the primary winding L1. The AC active clamp 220 includes a switching circuit 230 having first and second clamping switches M3, M4 series coupled in opposition. The AC active clamp 220 further includes a first clamping and energy storage capacitor CZVS1 coupled between the switching circuit 230 and the first end tap A of the primary winding L1. The AC active clamp 220 further includes a second clamping and energy storage capacitor CZVS2 coupled between the switching circuit 230 and a second end tap B of the primary winding L1. The AC active clamp 220 further includes first and second auxiliary diodes DZVS1, DZVS2 coupled to across the first and second clamping and energy storage capacitors CZVS1, CZVS2, respectively. The first and second auxiliary diodes DZVS1, DZVS2 are employed to prevent the respective polarities of the first and second clamping and energy storage capacitors CZVS1, CZVS2 from changing as was possible with the AC active clamp 120 illustrated and described with respect to FIG. 1. Maintaining the respective polarities of the first and second clamping and energy storage capacitors CZVS1, CZVS2 throughout first and second half-cycles makes the use electrolytic capacitors possible. Electrolytic capacitors generally possess higher energy densities, which may be desirable in a particular application of the present invention. The AC active clamp 220 is configured to mitigate adverse effects of a reverse recovery phenomenon associated with the rectifier 250 and to effect substantially zero voltage switching of the first and second power switches M1, M2 of the primary switching circuit 210.

The power factor corrector 200 still further includes a controller 270 coupled to the first and second power switches M1, M2 of the primary switching circuit 210 and the first and second clamping switches M3, M4 of the AC active clamp 220. The controller 270 monitors the output voltage Vout, the input current and the polarity of the input AC power and accordingly operates the first and second power switches M1, M2 and the first and second clamping switches M3, M4 to regulate the output voltage Vout and provide power factor correction of the input AC power. In the illustrated embodiment, the first clamping switch M3 may be driven by a signal complementary to a drive signal to the first power switch M1. Analogously, the second clamping switch M4 may be driven by a signal complementary to a drive signal to the second power switch M2. Of course, other methods of driving the first and second clamping switches M3, M4 are well within the broad scope of the present invention.

The use of the magnetically coupled inductances (including inductances Lin, L1, L2, L3, LF) allows the power factor corrector 200 to employ larger clamping and energy storage capacitors CZVS1, CZVS2 that may enable the output current ripple to be significantly reduced.

The operation of the power factor corrector 200 is similar to that illustrated and described with respect to the power factor corrector 100 of FIG. 1 and, as a result, will not be described in detail.

During the transitions between the first and second half-cycles of the AC power, wherein the AC voltage and current are at a minimum, the larger clamping and energy storage capacitors CZVS1, CZVS2 of the AC active clamp 230 are employable to provide sufficient power to the output of the power factor corrector 200. When the input voltage is positive, energy from the second clamping and energy storage capacitor CZVS2 is transferred to the output. A portion of the energy, however, may be used to charge the first clamping and energy storage capacitor CZVS1. As a result, less than the full amount of energy stored in the second clamping and energy storage capacitor CZVS2 may be transferred to the output. When the input voltage is negative, a portion of the energy from the first clamping and energy storage capacitor CZVS1 is used to charge the second clamping and energy storage capacitor CZVS2, again resulting in less energy transfer to the output. The topology of the power factor corrector 200 allows the output current ripple to be reduced substantially to allow the power factor corrector 200 to be employed with loads that may be more sensitive to the output current ripple.

Figure 3:
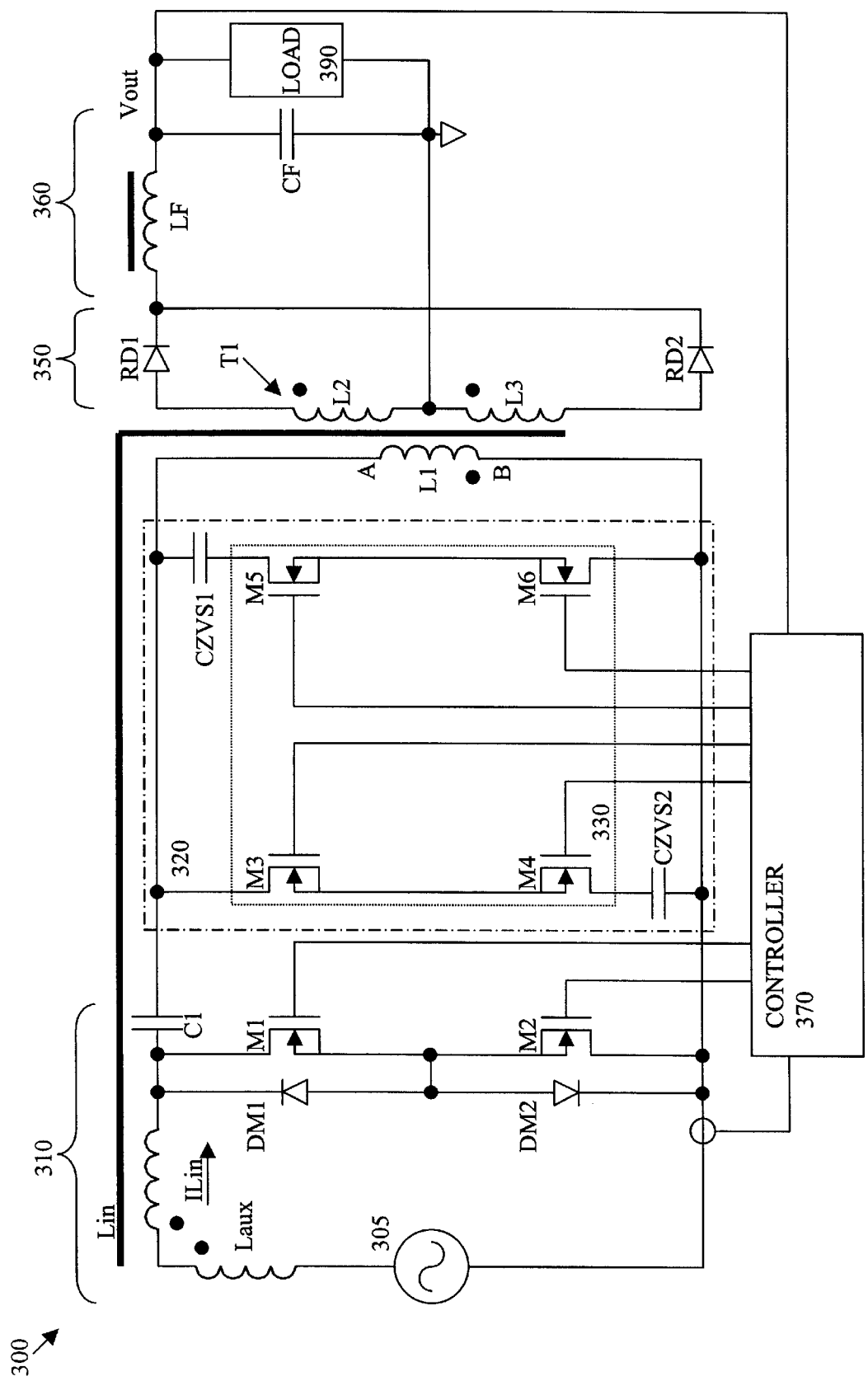
FIG. 3 illustrates a schematic diagram of another embodiment of an isolated power factor corrector constructed in accordance with the principles of the present invention.

Turning now to FIG. 3, illustrated is a schematic diagram of another embodiment of an isolated power factor corrector 300 constructed in accordance with the principles of the present invention. The power factor corrector 300 has an input couplable to a source of AC power 305 and an output couplable to a load 390. The power factor corrector 300 includes a primary switching circuit 310 coupled to a primary winding L1 of an isolation transformer T1. The power factor corrector 300 further includes a rectifier 350 (having first and second rectifying diodes RD1, RD2) coupled to a secondary winding (illustrated as first and second secondary winding portions L2, L3) of the isolation transformer T1. The power factor corrector 300 further includes an output filter 360 (having a filter inductor LF and a filter capacitor CF) coupled to the output of the power factor corrector 300.

The primary switching circuit 310 includes an input inductor Lin and an auxiliary inductor Laux coupled to the input. The auxiliary inductor Laux may be a leakage inductance of the input inductor Lin or may be an additional inductance employed to supplement the input inductor Lin. Analogous to the power factor corrector 200 illustrated and described with respect to FIG. 2, the power factor corrector 300 employs magnetically coupled inductances to reduce the size and component count of the power factor corrector 300.

The primary switching circuit 310 further includes first and second power switches M1, M2 (each having an intrinsic body diode DM1, DM2, respectively) coupled to the input inductor Lin. The primary switching circuit 310 further includes an energy storage capacitor C1 coupled between the first power switch M1 and a first end tap A of the primary winding L1.

The power factor corrector 300 further includes an AC active clamp 320 coupled across the primary winding L1. The AC active clamp 320 includes a switching circuit 330 having first and second clamping switches M3, M4, series coupled in opposition (forming a first branch) and third and fourth clamping switches M5, M6, series coupled in opposition (forming a second branch). The AC active clamp 320 further includes a first clamping and energy storage capacitor CZVS1 coupled between the third and fourth clamping switches M5, M6 of the switching circuit 330 and the first end tap A of the primary winding L1. The AC active clamp 320 further includes a second clamping and energy storage capacitor CZVS2 coupled between the first and second clamping switches M3, M4 of the switching circuit 330 and a second end tap B of the primary winding L1. The AC active clamp 320 is configured to mitigate adverse effects of a reverse recovery phenomenon associated with the rectifier 350 and to effect substantially zero voltage switching of the first and second power switches M1, M2 of the primary switching circuit 310.

The power factor corrector 300 still further includes a controller 370 coupled to the first and second power switches M1, M2 of the primary switching circuit 310 and the first, second, third and fourth clamping switches M3, M4, M5, M6 of the AC active clamp 320. The controller 370 monitors the output voltage Vout, the input current and the polarity of the input AC power and accordingly operates the first and second power switches M1, M2 and the first, second, third and fourth clamping switches M3, M4, M5, M6 to regulate the output voltage Vout and provide power factor correction of the input AC power.

The operation of the power factor corrector 300 is analogous to the power factor corrector 100 illustrated and described with respect to FIG. 1 and, as a result will not be described in detail. Employing a switching circuit 330 having two separate branches allows the first and second clamping and energy storage capacitors CZVS1, CZVS2 to operate independently without the requirement of current sharing between the first and second clamping and energy storage capacitors CZVS1, CZVS2. Energy provided to the output may thus be higher than that provided by the power factor corrector 200 illustrated and described with respect to FIG. 2.

Figure 4:
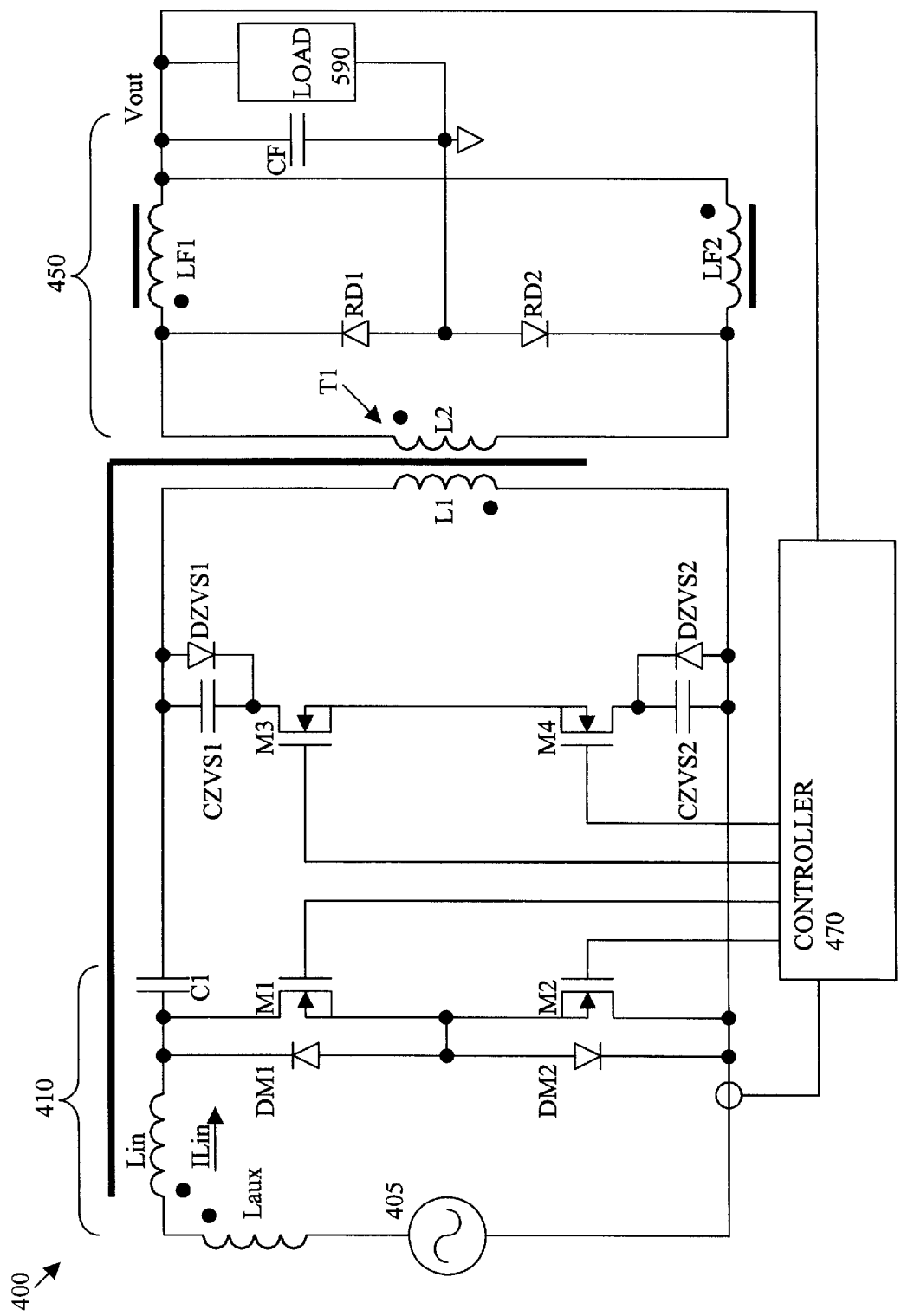
FIG. 4 illustrates a schematic diagram of another embodiment of an isolated power factor corrector constructed in accordance with the principles of the present invention.

Turning now to FIG. 4, illustrated is a schematic diagram of another embodiment of an isolated power factor corrector 400 constructed in accordance with the principles of the present invention. The power factor corrector 400 is substantially similar to the power factor corrector 200 illustrated and described with respect to FIG. 2 but employs a current doubler output stage 450 including first and second rectifying diodes RD1, RD2, first and second filter inductors LF1, LF2 and filter capacitor CF. Of course, various output stage topologies may be used and remain well within the broad scope of the present invention.

Figure 5:
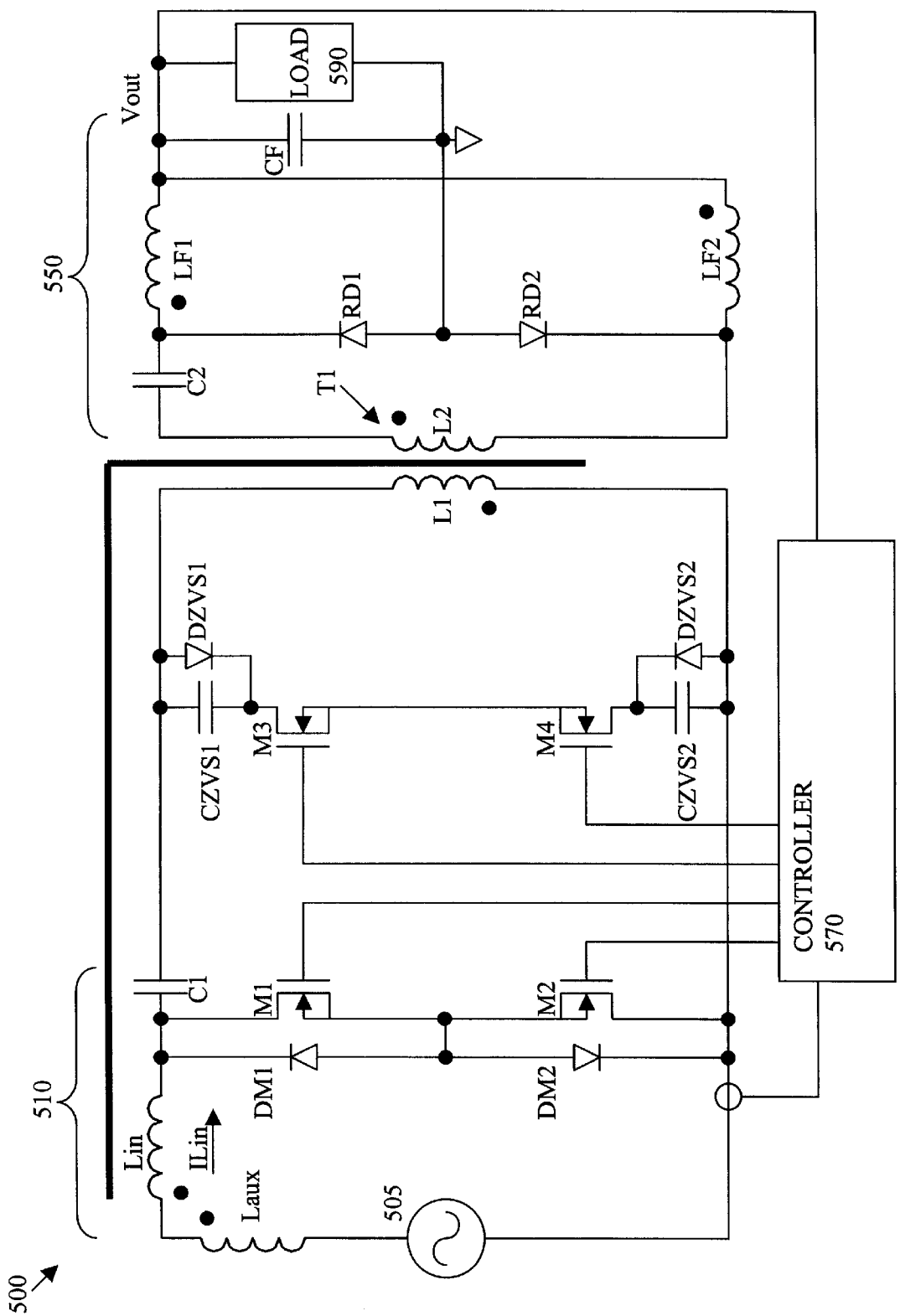
FIG. 5 illustrates a schematic diagram of another embodiment of an isolated power factor corrector constructed in accordance with the principles of the present invention.

Turning now to FIG. 5, illustrated is a schematic diagram of another embodiment of an isolated power factor corrector 500 constructed in accordance with the principles of the present invention. The power factor corrector 500 is substantially similar to the power factor corrector 400 illustrated and described with respect to FIG. 4 but employs an additional capacitor C2 in a current doubler output stage 550. The additional capacitor C2 is interposed between the secondary winding L2 and the first rectifying diode RD1 to allow the transformer T1 to operate without a DC magnetizing current. Of course, various output stage topologies may be used and remain well within the broad scope of the present invention.

Those skilled in the art should understand that the previously described embodiments of the AC active clamp, method of operation thereof and power factor corrector are submitted for illustrative purposes only and that other embodiments of the AC active clamp capable of mitigating the adverse effects of the reverse recovery phenomenon associated with the rectifier and effecting substantially zero voltage switching of the power switches of the primary switching circuit are well within the broad scope of the present invention. Additionally, exemplary embodiments of the present invention have been illustrated with reference to specific electronic components. Those skilled in the art are aware, however, that components may be substituted (not necessarily with components of the same type) to create desired conditions or accomplish desired results. For instance, multiple components may be substituted for a single component and vice-versa. The principles of the present invention may be applied to a wide variety of power circuit topologies. For a better understanding of a variety of power converter topologies, see *Modern DC-to-DC Switchmode Power Converter Circuits,* by Rudolph P. Severns and Gordon Bloom, Van Nostrand Reinhold Company, New York, N.Y. (1985), which is incorporated herein by reference in its entirety.

Although the present invention has been described in detail, those skilled in the art should understand that they can make various changes, substitutions and alterations herein without departing from the spirit and scope of the invention in its broadest form.

What is claimed is:

1. For use with a power factor corrector having a primary switching circuit coupled to a primary winding of an isolation transformer and a rectifier coupled to a secondary winding of said isolation transformer, said primary switching circuit having first and second power switches configured to receive unrectified AC power, an AC active clamp, comprising:
   a switching circuit having first and second clamping switches series coupled in opposition; and
   a capacitor coupled to said switching circuit, said switching circuit and said capacitor coupled across at least a portion of said primary winding and configured to mitigate adverse effects of a reverse recovery phenomenon associated with said rectifier and to effect substantially zero voltage switching of said first and second power switches of said primary switching circuit.

2. The AC active clamp as recited in claim 1 wherein said capacitor is coupled between said switching circuit and a first end tap of said primary winding, said AC active clamp further comprising a second capacitor coupled between said switching circuit and a second end tap of said primary winding.

3. The AC active clamp as recited in claim 1 further comprising an auxiliary diode coupled across said capacitor.

4. The AC active clamp as recited in claim 2 further comprising:
   a first auxiliary diode coupled across said capacitor; and
   a second auxiliary diode coupled across said second capacitor.

5. The AC active clamp as recited in claim 1 wherein switching circuit further includes third and fourth clamping switches series coupled in opposition, said AC active clamp further comprising a second capacitor coupled to said series-coupled third and fourth clamping switches.

6. The AC active clamp as recited in claim 1 wherein said power factor corrector employs a magnetically coupled filter.

7. The AC active clamp as recited in claim 1 wherein said power factor corrector employs topologies selected from the group consisting of:
   boost topologies;
   topologies having capacitive coupling between an input and an output of said power factor corrector;
   SEPIC topologies;
   flyback topologies; and
   Zeta topologies.

8. For use with a power factor corrector having a primary switching circuit coupled to a primary winding of an isolation transformer and a rectifier coupled to a secondary winding of said isolation transformer, said primary switching circuit having first and second power switches configured to receive unrectified AC power, a method of actively clamping energy of said power factor corrector, comprising:
   mitigating adverse effects of a reverse recovery phenomenon associated with said rectifier with an AC active clamp having:
      a switching circuit including first and second clamping switches series coupled in opposition, and
      a capacitor coupled to said switching circuit, said switching circuit and said capacitor coupled across at least a portion of said primary winding; and
   effecting, with said AC active clamp, substantially zero voltage switching of said first and second power switches of said primary switching circuit.

9. The method as recited in claim 8 wherein said capacitor is coupled between said switching circuit and a first end tap of said primary winding, said AC active clamp further comprising a second capacitor coupled between said switching circuit and a second end tap of said primary winding.

10. The method as recited in claim 8 further comprising reducing an output ripple current of said power factor corrector.

11. The method as recited in claim 9 wherein said AC active clamp further comprises a first auxiliary diode coupled across said capacitor and a second auxiliary diode coupled across said second capacitor.

12. The method as recited in claim 8 wherein said switching circuit further includes third and fourth clamping switches series coupled in opposition, said AC active clamp further comprising a second capacitor coupled to said series-coupled third and fourth clamping switches.

13. The method as recited in claim 8 further comprising filtering said unrectified AC power with a magnetically coupled filter.

14. The method as recited in claim 8 wherein said power factor corrector employs topologies selected from the group consisting of:
   boost topologies;
   topologies having capacitive coupling between an input and an output of said power factor corrector;
   SEPIC topologies;
   flyback topologies; and
   Zeta topologies.

15. An isolated power factor corrector having an input and adapted to provide a DC output voltage at an output thereof, comprising:
   an isolation transformer having a primary winding and a secondary winding;
   a primary switching circuit, interposed between said input and said primary winding, including first and second power switches configured to receive unrectified AC power;
   a rectifier, interposed between said secondary winding and said output, configured to rectify a waveform from said isolation transformer to develop said DC output voltage; and
   an AC active clamp, coupled to said primary switching circuit, comprising:
      a switching circuit having first and second clamping switches series coupled in opposition; and
      a capacitor coupled to said switching circuit, said switching circuit and said capacitor coupled across at least a portion of said primary winding and configured to mitigate adverse effects of a reverse recovery phenomenon associated with said rectifier and to effect substantially zero voltage switching of said first and second power switches of said primary switching circuit.

16. The power factor corrector as recited in claim 15 wherein said capacitor is coupled between said switching circuit and a first end tap of said primary winding, said AC active clamp further comprising a second capacitor coupled between said switching circuit and a second end tap of said primary winding.

17. The power factor corrector as recited in claim 15 wherein said AC active clamp further comprises an auxiliary diode coupled across said capacitor.

18. The power factor corrector as recited in claim 16 wherein said AC active clamp further comprises a first auxiliary diode coupled across said capacitor and a second auxiliary diode coupled across said second capacitor.

19. The power factor corrector as recited in claim 15 wherein said switching circuit further includes third and fourth clamping switches series coupled in opposition, said AC active clamp further comprising a second capacitor coupled to said series-coupled third and fourth clamping switches.

20. The power factor corrector as recited in claim 15 wherein said isolation transformer forms a portion of a magnetically coupled filter.

21. The power factor corrector as recited in claim 15 wherein said power factor corrector employs topologies selected from the group consisting of:
   boost topologies;
   topologies having capacitive coupling between said input and said output;
   SEPIC topologies;
   flyback topologies; and
   Zeta topologies.

* * * * *